US009848698B2

(12) United States Patent
Ortiz

(10) Patent No.: US 9,848,698 B2
(45) Date of Patent: Dec. 26, 2017

(54) DISPLAY AND ENCLOSURE APPARATUS

(71) Applicant: INTERNATIONAL GAMING PROJECTS LIMITED, Qormi (MT)

(72) Inventor: Alejandro De Viveiros Ortiz, Vila Uberabinha-Sao Paulo (BR)

(73) Assignee: INTERNATIONAL GAMING PROJECTS LIMITED, Qormi (MT)

( * ) Notice: Subject to any disclaimer, the term of this patent is extended or adjusted under 35 U.S.C. 154(b) by 0 days.

(21) Appl. No.: 14/823,790

(22) Filed: Aug. 11, 2015

(65) Prior Publication Data

US 2017/0042327 A1    Feb. 16, 2017

(51) Int. Cl.
| | |
|---|---|
| A47B 5/00 | (2006.01) |
| A47B 81/06 | (2006.01) |
| F16M 13/02 | (2006.01) |
| F16M 11/04 | (2006.01) |
| F16M 11/08 | (2006.01) |
| H04N 5/64 | (2006.01) |
| G09F 9/30 | (2006.01) |
| G09F 13/02 | (2006.01) |
| G09F 15/00 | (2006.01) |

(52) U.S. Cl.
CPC ........... *A47B 81/06* (2013.01); *F16M 11/046* (2013.01); *F16M 11/08* (2013.01); *F16M 13/02* (2013.01); *G09F 9/30* (2013.01); *G09F 13/02* (2013.01); *G09F 15/0037* (2013.01); *H04N 5/64* (2013.01)

(58) Field of Classification Search
CPC ........... A47B 1/06; A47B 1/061; A47B 1/064; F16M 13/02; F16M 13/027; F16M 11/10; F16M 11/2014; F16M 11/28
USPC .......................................................... 312/7.2
See application file for complete search history.

(56) References Cited

U.S. PATENT DOCUMENTS

| | | | | |
|---|---|---|---|---|
| 4,203,636 A | * | 5/1980 | Wells | A47B 81/061 248/185.1 |
| 4,420,052 A | * | 12/1983 | Hale | G01G 19/52 177/132 |
| 5,169,219 A | * | 12/1992 | Obbink | F16M 11/24 248/354.3 |

(Continued)

FOREIGN PATENT DOCUMENTS

FR      2462124 A1 *  2/1981  ........... A47B 81/061

OTHER PUBLICATIONS tv-armor.com, www.tv-armor.com/tv-screen-enclosures, 4 Pages.

*Primary Examiner* — Stanton L Krycinski
*Assistant Examiner* — Andres F Gallego
(74) *Attorney, Agent, or Firm* — John S. Artz; Dickinson Wright PLLC

(57) ABSTRACT

A display and enclosure apparatus for supporting a television includes a cabinet that has a back face and at least one flange extending from the back face for holding the television. A decorative member is connected to the flange of the cabinet. The decorative member defines a hollow that extends in a non-linear shape and terminates at a mouth. A bracket interconnects the cabinet and decorative member. The bracket includes a plate that overlies and is connected to the flange of the cabinet, and at least one wing that extends from the plate. The wing has a shape that substantially matches the non-linear shape of the hollow of the decorative member and nests in the hollow for interconnecting the flange of the cabinet and the decorative member.

15 Claims, 3 Drawing Sheets

(56) References Cited

U.S. PATENT DOCUMENTS

| | | | | |
|---|---|---|---|---|
| 5,298,693 | A * | 3/1994 | Heijn | A47B 81/06 |
| | | | | 181/199 |
| 5,405,117 | A * | 4/1995 | Davis | F16M 11/04 |
| | | | | 248/323 |
| 5,797,568 | A * | 8/1998 | Canton Gongora | F16M 11/10 |
| | | | | 248/122.1 |
| 6,581,887 | B2 * | 6/2003 | Lapidez | F16M 11/048 |
| | | | | 248/122.1 |
| 6,758,454 | B2 | 7/2004 | Smed | |
| 7,044,423 | B2 | 5/2006 | Bober et al. | |
| 7,077,373 | B1 * | 7/2006 | Hoebener | F16M 11/10 |
| | | | | 248/278.1 |
| D603,191 | S | 11/2009 | Priestman | |
| 7,679,888 | B2 | 3/2010 | Kirschner et al. | |
| D613,075 | S | 4/2010 | DeNicola | |
| 8,134,651 | B1 | 3/2012 | Reid | |
| D669,075 | S | 10/2012 | Seo | |
| 8,310,824 | B2 * | 11/2012 | Dunn | H04N 5/64 |
| | | | | 312/223.1 |
| 8,827,232 | B2 * | 9/2014 | Crowley | A47B 43/003 |
| | | | | 211/175 |
| 9,103,486 | B2 * | 8/2015 | Crowley | F16M 13/02 |
| 2004/0265112 | A1 * | 12/2004 | Nieuwenhuis | A61B 19/0248 |
| | | | | 414/744.5 |
| 2005/0062238 | A1 | 3/2005 | Broadfield et al. | |
| 2007/0252919 | A1 * | 11/2007 | McGreevy | F16M 11/10 |
| | | | | 348/825 |
| 2008/0030939 | A1 * | 2/2008 | Gillespie | F16M 11/00 |
| | | | | 361/679.01 |
| 2012/0168594 | A1 | 7/2012 | Garneau et al. | |
| 2012/0194750 | A1 | 8/2012 | Carr | |
| 2014/0265752 | A1 | 9/2014 | Caine et al. | |
| 2014/0285073 | A1 | 9/2014 | Kim et al. | |

* cited by examiner

`US 9,848,698 B2`

DISPLAY AND ENCLOSURE APPARATUS

TECHNICAL FIELD

A display and enclosure apparatus for supporting a television.

BACKGROUND OF THE DISCLOSURE

Decorative displays are known in the art for being exhibited in venues such as casinos to provide for increased excitement among patrons. Such decorative displays often include television enclosures for displaying graphics on a television disposed therein while protecting the television. An example of a television enclosure is disclosed in U.S. Patent Application Publication No. US 2012/0194750 to James E. Can. The enclosure apparatus includes a cabinet that has a back face and a plurality of flanges that extend from the back face that define a compartment for holding the television.

There remains a need in the art for improvements to decorative displays to adequately secure decorative members of the display to television enclosures while preserving the aesthetic characteristics of the display.

SUMMARY OF THE DISCLOSURE

The disclosure provides for a display and enclosure apparatus for supporting a television. The display and enclosure apparatus includes a cabinet that has a back face and at least one flange extending from the back face for holding the television. A decorative member is connected to the flange of the cabinet. The decorative member defines a hollow that extends in a non-linear shape and terminates at a mouth. A bracket interconnects the cabinet and decorative member. The bracket includes a plate that overlies and is connected to the flange of the cabinet, and at least one wing that extends from the plate. The wing has a shape that substantially matches the non-linear shape of the hollow of the decorative member and nests in the hollow for interconnecting the flange of the cabinet and the decorative member.

It is therefore an aspect of the present disclosure to provide a bracket that secures the decorative member to the cabinet while preserving the aesthetic characteristics of the decorative member and cabinet. More specifically, since the wing of the bracket has a shape that substantially matches the non-linear shape of the hollow of the decorative member and nests in the hollow, the bracket is substantially concealed by the decorative member, therefore preserving the aesthetic appeal of the decorative member while fixedly securing the decorative member to the cabinet.

BRIEF DESCRIPTION OF THE DRAWINGS

Other advantages of the present disclosure will be readily appreciated, as the same becomes better understood by reference to the following detailed description when considered in connection with the accompanying drawings wherein.

DESCRIPTION OF THE PREFERRED EMBODIMENT

Figure 1:
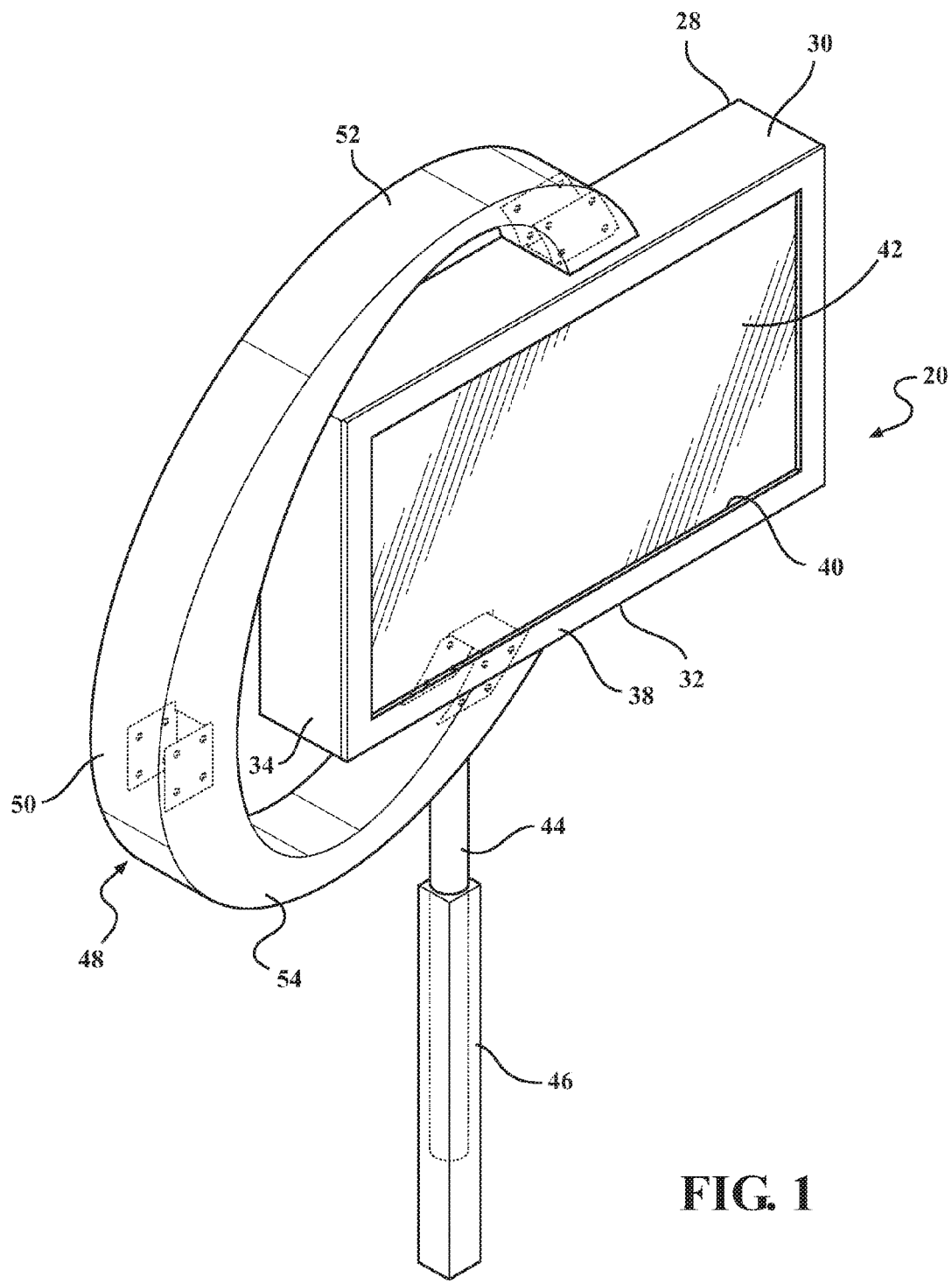
FIG. 1 is a perspective view of a preferred embodiment of the display and enclosure apparatus according to an aspect of the disclosure.

Referring to the Figures, wherein like numerals indicate corresponding parts throughout the several views, a display and enclosure apparatus 20 is generally shown for supporting a television 22.

The display and enclosure apparatus 20 includes a cabinet 24 for holding the television 22. The cabinet 24 has a rectangular-shaped back face 26 and defines a periphery 28. A top flange 30, a bottom flange 32 and a pair of side flanges 34 each extend from the periphery 28 of the back face 26 in perpendicular relationship with the back face 26 to define a compartment 36 therebetween for holding the television 22. The top, bottom and side flanges 30, 32, 34 each have a rectangular shape, however, they could have other shapes such as, but not limited to, an oval shape.

The cabinet 24 further includes a rectangular-shaped front frame 38 that is removeably connected to the top, bottom and side flanges 30, 32, 34 for closing the compartment 36. The front frame 38 defines a rectangular-shaped opening 40 for allowing the television 22 to be viewed therethrough. The opening 40 could have other shapes such as, but not limited to, an oval shape. A rectangular-shaped panel 42 of glass material is secured to the front frame 38 in overlying relationship with the opening 40 of the front frame 38 for protecting the television 22 while allowing the television 22 to be viewed through the panel 42. It should be appreciated that the panel 42 could be made out of other materials, e.g., an acrylic material, and could have other shapes, e.g., an oval shape. Furthermore, it should be appreciated that the cabinet 24 could function to hold the television 22 without the panel 42.

A cylindrical-shaped inner leg 44 is connected to and extends from the bottom flange 32. An outer leg 46 that has a square shaped cross-section and defines a bore 47 telescopingly receives the inner leg 44 for removeably connecting the display apparatus to a supporting object. The supporting object could be a table, casino gaming machine or the like. It should be appreciated that the inner leg 44 may be removed from the outer leg 46 for placement in another outer leg 46 at an alternative location. Further, the inner leg 44 may rotate within the outer leg 46, thereby allowing rotation of the cabinet 24. Additionally, the inner leg 44 may define a passage that extends therethrough while being concealed for receiving cables and the like from the television 22 to allow the cables to pass therethrough for being connected to another object, e.g., a power source, while being concealed.

A decorative member 48 that has a C-shaped cross-section extends about one of the side flanges 34 and is connected to the top and bottom flanges 30, 32 of the cabinet 24. The decorative member 48 has a base segment 50, an upper leg segment 52 and a lower leg segment 54. The upper and lower leg segments 52, 54 each extend from the base segment 50 in an arcuate shape and terminate at an upper face 56 and a lower face 58, respectively. It should be appreciated that the decorative member 48 could have other shapes and could be configured in various ways to enhance its aesthetic appeal. For example, the decorative member 48 may include lights disposed therein for illuminating the decorative member 48. The inner leg 44 extends through the lower leg segment 54 of the decorative member 48 to connect to the bottom flange 32 of the cabinet 24 (as shown in FIG. 1) to partially conceal the inner leg 44.

The decorative member 48 further defines a hollow 60 that extends in a non-linear shape from the upper and lower faces 56, 58 of the upper and lower leg segments 52, 54. The hollow 60 is defined by a forward wall 62, a rearward wall 64 and a pair of side walls 66, with the forward and rear walls 62, 64 facing one another, and the side walls 66 extending therebetween. In the preferred embodiment, the hollow 60 extends continuously between the upper and lower faces 56, 58, however, it should be appreciated that the hollow 60 could extend to other lengths. For example, a separate hollow 60 could extend from each of the upper and lower faces 56, 58 along predetermined lengths. In the preferred embodiment, the non-linear shape is an arc-shape, however, other non-linear shapes are anticipated. The upper and lower faces 56, 58 each have a rectangular-shaped cross-section and define a mouth into the hollow 60.

An upper bracket 70 is at least partially received by the mouth of the upper leg segment 52 and interconnects the upper leg segment 52 and the top flange 30 of the cabinet 24. Likewise, a lower bracket 72 is received by the mouth of the lower leg segment 54 and interconnects the lower leg segment 54 and the bottom flange 32 of the cabinet 24.

Figure 4:
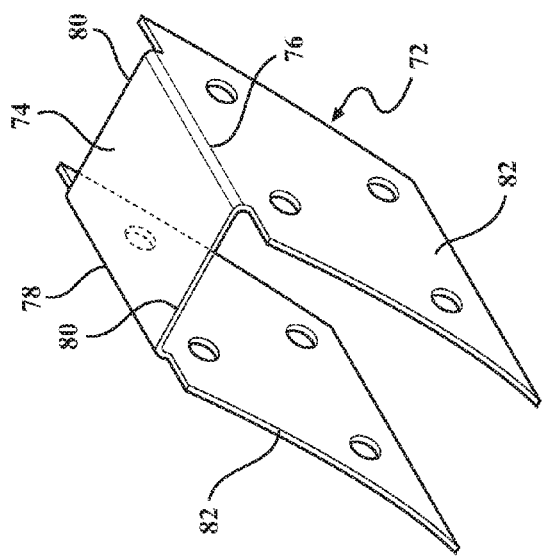
FIG. 4 is a perspective view of a lower bracket of the preferred embodiment of the display and enclosure apparatus according to an aspect of the disclosure.
Figure 3:
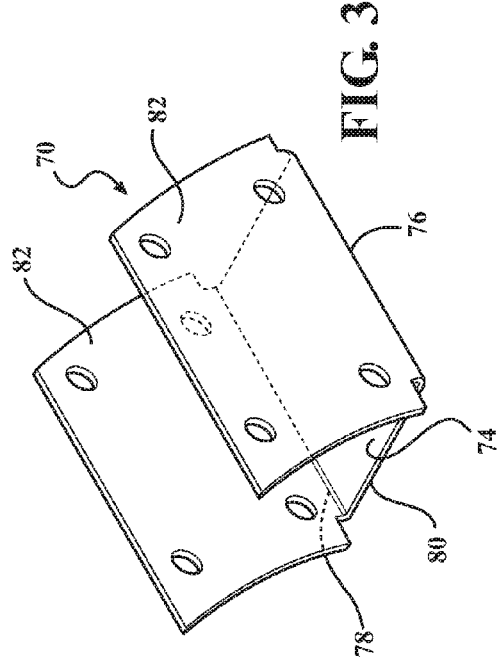
FIG. 3 is a perspective view of an upper bracket of the preferred embodiment of the display and enclosure apparatus according to an aspect of the disclosure.
Figure 5:
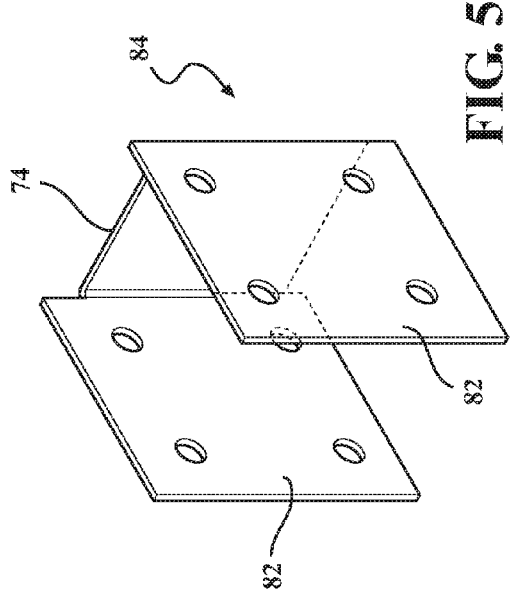
FIG. 5 is a perspective view of a middle bracket of the preferred embodiment of the display and enclosure apparatus according to an aspect of the disclosure.

As best presented in FIG. 3, the upper bracket 70 includes a plate 74 that has a rectangular shape for overlying and being connected to the top flange 30 of the cabinet 24. Correspondingly, as best presented in FIG. 4, the lower bracket 72 includes a plate 74 that has a rectangular shape for overlying and being connected to the bottom flange 32 of the cabinet 24. The plates may be connected to the top and bottom flanges 30, 32 by way of adhesives, bolts, or the like. Furthermore, the plate 74 of the upper bracket 70 and the plate 74 of the lower bracket 72 each have a front edge 76, a rear edge 78 and a pair of side edges 80 that extend therebetween.

The upper bracket 70 further includes a pair of wings 82 that each extend from one of the front and rear edges 76, 78 in spaced and parallel relationship with one another, and each are received by the mouth of the upper leg segment 52 in abutting relationship with one of the forward and rear walls 62, 64 of the decorative member 48. Likewise, the lower bracket 72 further includes a pair of wings 82 that each extend from one of the front and rear edges 76, 78 in spaced and parallel relationship with one another and, each are received by the mouth of the lower leg segment 54 in abutting relationship with one of the forward and rear walls 62, 64 of the decorative member 48. It should be appreciated that the wings 82 of the upper and lower brackets 70, 72 prevent lateral movement of the upper and lower brackets 70, 72 relative to the decorative member 48.

The wings 82 of the upper bracket 70 each having an arcuate shape that substantially matches the arcuate shape of the hollow 60 in the upper leg segment 52, and are nested in the hollow 60 of the decorative member 48 at the opening 40 of the upper leg segment 52. Likewise, the wings 82 of the lower bracket 72 each have an arcuate shape that substantially matches the arcuate shape of the hollow 60 in the lower leg segment 54, and are nested in the hollow 60 of the decorative member 48 at the lower leg segment 54. The wings 82 are connected to the forward and rear walls 62, 64 of the upper and lower leg segments 52, 54 by way of fasteners. The fasteners include, but are not limited to bolts, screws, adhesives and the like. Furthermore the upper and lower leg segments 52, 54 may define a notch in the hollow 60 therein for limiting movement of the upper and lower brackets 70, 72 into the hollow 60.

As best presented in FIG. 1, when assembled, the plate 74 of the upper bracket 70 is disposed substantially flush with the mouth 68 of the upper leg segment 52, and the plate 74 of the lower bracket 72 is disposed substantially flush with the mouth 68 of the lower leg segment 54 such that the wings 82 of the upper and lower brackets 70, 72 are substantially concealed in the hollow 60. This is advantageous because it allows the upper and lower brackets 70, 72 to fixedly secure the decorative member 48 to the flange while maintaining the aesthetic appeal of the decorative member 48 and cabinet 24 since the bracket is substantially concealed. Furthermore, because the shapes of the wings of the upper and lower brackets 70, 72 substantially match that of the hollow 60 in the upper and lower leg segments 52, 54, the upper and lower brackets 70, 72 are easily able to be slid into position in the hollow 60.

Figure 2:
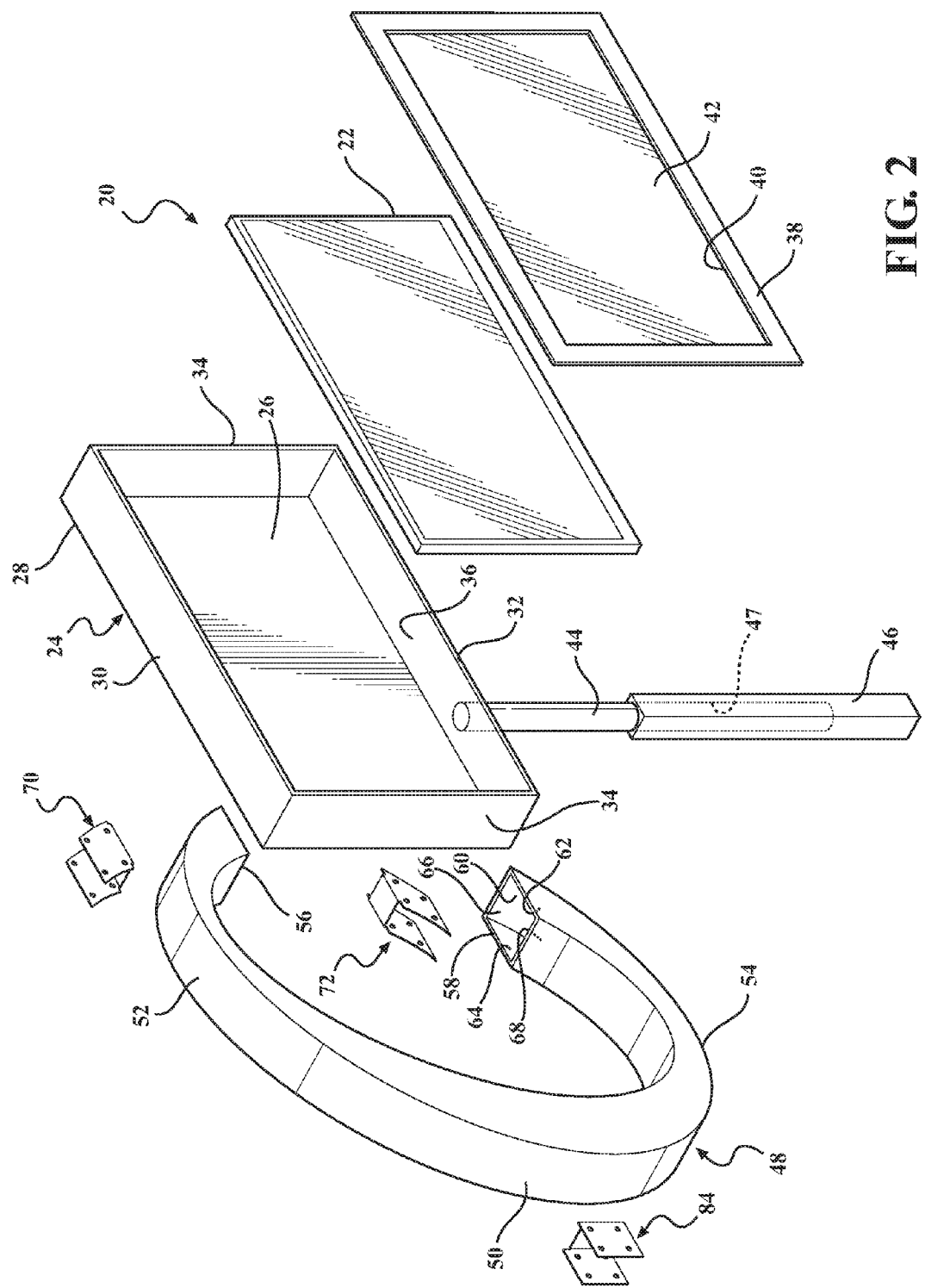
FIG. 2 is a perspective exploded view of the preferred embodiment of the display and enclosure apparatus according to an aspect of the disclosure.

As best shown in FIG. 2, a middle bracket 84 is disposed in the hollow 60 in the base segment 50 of the decorative member 48 to provide structural support to the decorative member 48. Similar to the upper and lower brackets 70, 72, the middle bracket 84 includes a plate 74 and a pair of wings 82 extending therefrom for securing the middle bracket 84 in the hollow 60 of the base segment 50.

Obviously, many modifications and variations of the present disclosure are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A display and enclosure apparatus for supporting a television, the display and enclosure apparatus comprising:
   a cabinet having a back face defining a periphery and at least one flange extending from said back face and surrounding said periphery of said back face to define a compartment between said back face and said at least one flange for holding the television;
   a decorative member having at least one elongated wall terminating at at least one planar face, wherein said at least one planar face overlies said at least one flange of said cabinet; said decorative member further defining a hollow extending non-linearly from said at least one planar face, wherein said at least one planar face defines a mouth into said hollow, said mouth facing said at least one flange of said cabinet;
   at least one bracket including a plate being planar and at least one wing extending from said plate, with said plate overlying said at least one flange of said cabinet for connection thereto and disposed flush with said at least one planar face of said decorative member at said mouth, and wherein said at least one wing has at least one edge extending non-linearly and entirely received by and nested in said hollow and secured to said decorative member for interconnecting said at least one flange of said cabinet and said decorative member with said at least one wing concealed by said decorative member in said hollow;

wherein said at least one flange includes a top flange and a bottom flange and a pair of side flanges with said top and bottom flanges disposed in spaced relationship with one another;

said decorative member extends in a smooth arc about one of said side flanges and is connected to said top and bottom flanges of said cabinet;

wherein said decorative member has a C-shape and includes a base segment and an upper leg segment and a lower leg segment and wherein said at least one planar face includes an upper planar face defined by said upper leg segment and a lower planar face defined by said lower leg segment; and said at least one mouth includes a pair of mouths with one of said mouths defined by said upper planar face and another of said mouths defined by said lower planar face, said pair of mouths facing one another.

2. The display and enclosure apparatus as set forth in claim 1 wherein said at least one wing includes a pair of wings extending in spaced relationship with one another away from said plate.

3. The display and enclosure apparatus as set forth in claim 2 wherein each of said wings extend perpendicularly from said plate in parallel relationship with one another.

4. The display and enclosure apparatus as set forth in claim 3 wherein said plate of said at least one bracket has a rectangular shape.

5. The display and enclosure apparatus as set forth in claim 4 wherein said plate has a front edge and a rear edge and a pair of side edges extending therebetween; each of said wings extend from one of said front and rear edges of said plate.

6. The display and enclosure apparatus as set forth in claim 2 wherein said at least one elongated wall of said decorative member includes a forward wall, a rearward wall and a pair of side walls with said forward and rearward walls disposed in spaced and parallel relationship with one another, and wherein said hollow of said decorative member is defined by said forward wall, said rearward wall, and said pair of side walls, said at least one edge of each of said wings of said at least one bracket engages and nests with at least one of said forward and rear walls for preventing lateral movement of said at least one bracket relative to said decorative member.

7. The display and enclosure apparatus as set forth in claim 1 wherein said back face of said cabinet has a rectangular shape; said at least one flange includes the top flange and the bottom flange and the pair of side flanges each having a rectangular shape and extending from said periphery of said back face in perpendicular relationship with said back face.

8. The display and enclosure apparatus as set forth in claim 7 wherein said cabinet further includes a front frame having a rectangular shape and removeably connected to said top and bottom and side flanges for closing said compartment.

9. The display and enclosure apparatus as set forth in claim 8 wherein said front frame defines an opening for allowing the television to be viewed through said opening.

10. The display and enclosure apparatus as set forth in claim 9 and further including a panel of glass material disposed in said opening of said front frame for protecting the television while allowing the television to be viewed through said panel.

11. The display and enclosure apparatus as set forth in claim 1 wherein said hollow extends in a smooth arc.

12. The display and enclosure apparatus as set forth in claim 1 wherein said upper and lower planar faces each have a rectangular shape and wherein said mouths each have a rectangular shape at said upper and lower planar faces.

13. The display and enclosure apparatus as set forth in claim 1 wherein said at least one bracket includes an upper bracket received by said mouth of said upper leg segment and interconnecting said upper leg segment and said top flange and a lower bracket received by said mouth of said lower leg segment and interconnecting said lower leg segment and said bottom flange of said cabinet, said plate of said upper bracket and said plate of said lower bracket facing one another.

14. The display and enclosure apparatus as set forth in claim 1 wherein an inner leg is connected to and extends from said bottom flange; an outer leg is configured to telescopingly receive said inner leg for removeably connecting said display apparatus to a supporting object and for allowing said display apparatus to be raised and lowered.

15. A display and enclosure apparatus for supporting a television, the display and enclosure apparatus comprising:

a cabinet having a back face defining a periphery and at least one flange extending from said back face and surrounding said periphery to define a compartment between said back face and said at least one flange for holding the television;

a decorative member having an elongated forward wall, an elongated rearward wall, and a pair of elongated side walls with said forward and rear walls facing one another and with said elongated side walls facing one another;

said elongated walls of said decorative member terminating at opposite planar faces, said planar faces facing one another and overlying said at least one flange of said cabinet;

said elongated walls of said decorative member further defining a hollow extending non-linearly from each of said planar faces, and wherein each of said planar faces defines a mouth into said hollow;

a pair of brackets, each of said brackets being disposed in a respective one of said mouths, each of said brackets including a plate being planar and a pair of wings, with said plates facing one another and overlying said at least one flange of said cabinet, at least one of said plates being connected to said at least one flange of said cabinet, each of said plates being disposed flush with a respective one of said planar faces of said decorative member at said mouths, and wherein said pair of wings extend perpendicularly from said plates, respectively, and are entirely received by and are nested in said hollow;

each of said wings having a surface being planar and a pair of edges, wherein said surface of each of said wings engages said forward and rear walls, respectively, and wherein said pair of edges each extend non-linearly and engage and are nested with respective ones of said elongated side walls along the entire length of said edges; and said surface of each of said wings being secured to one of said forward and rear walls, respectively.

* * * * *